(12) United States Patent
Turshani et al.

(10) Patent No.: US 8,921,445 B2
(45) Date of Patent: Dec. 30, 2014

(54) CURABLE ADHESIVE COMPOSITIONS

(75) Inventors: Yassin Turshani, Roanoke, VA (US); Omar Mohamed Buazza, Louisville, KY (US)

(73) Assignee: Mitsui Chemicals, Inc., Tokyo (JP)

( * ) Notice: Subject to any disclaimer, the term of this patent is extended or adjusted under 35 U.S.C. 154(b) by 860 days.

(21) Appl. No.: 12/758,118

(22) Filed: Apr. 12, 2010

(65) Prior Publication Data
US 2010/0261018 A1    Oct. 14, 2010

Related U.S. Application Data

(60) Provisional application No. 61/168,401, filed on Apr. 10, 2009, provisional application No. 61/229,031, filed on Jul. 28, 2009, provisional application No. 61/234,536, filed on Aug. 17, 2009.

(51) Int. Cl.
| | | |
|---|---|---|
| C08F 2/50 | (2006.01) | |
| C08J 3/28 | (2006.01) | |
| B32B 7/12 | (2006.01) | |
| C09J 133/16 | (2006.01) | |
| C09J 133/14 | (2006.01) | |

(52) U.S. Cl.
CPC .............. C09J 133/14 (2013.01); C09J 133/16 (2013.01); C08J 3/28 (2013.01); B32B 7/12 (2013.01); C08F 2/50 (2013.01)
USPC ............... 522/96; 522/90; 522/113; 522/114; 522/120; 522/121; 522/100; 522/33; 522/37; 522/38; 522/64; 522/46; 522/53; 522/31; 522/66; 522/57; 522/178; 522/181; 522/168; 522/170; 428/355 R; 428/355 EP; 428/355 N; 428/355 AC; 428/355 EN

(58) Field of Classification Search
USPC ............. 522/90, 96, 113, 114, 120, 121, 104, 522/107, 100, 10, 170, 33, 37, 38, 64, 46, 522/53, 31, 66, 57; 428/344, 345, 349, 428/355 R, 355 EP, 355 N, 355 AC, 355 EN
See application file for complete search history.

(56) References Cited

U.S. PATENT DOCUMENTS

| | | | |
|---|---|---|---|
| 4,487,904 A * | 12/1984 | Fukuda et al. ................. 526/301 |
| 4,721,377 A * | 1/1988 | Fukuda et al. ........... 351/159.01 |
| 4,812,032 A * | 3/1989 | Fukuda et al. ........... 351/159.01 |
| 4,954,591 A | 9/1990 | Belmares |
| 5,040,870 A * | 8/1991 | Ohno et al. .................... 359/443 |
| 5,183,831 A * | 2/1993 | Bielat et al. ..................... 522/33 |
| 5,366,573 A | 11/1994 | Bayer et al. |
| 5,426,166 A | 6/1995 | Usifer et al. |
| 5,484,864 A | 1/1996 | Usifer et al. |
| 5,566,027 A | 10/1996 | Saitoh et al. |
| 5,624,759 A | 4/1997 | Usifer et al. |
| 5,698,285 A | 12/1997 | Kojima |
| 5,805,358 A | 9/1998 | Yamashita et al. |
| 5,883,192 A | 3/1999 | Natori et al. |
| 5,992,314 A | 11/1999 | Lorenz et al. |
| 6,150,479 A | 11/2000 | Klemarczyk et al. |
| 6,171,675 B1 | 1/2001 | Iida |
| 6,242,065 B1 | 6/2001 | Blomberg et al. |
| 6,337,118 B1 | 1/2002 | Takehana et al. |
| 6,342,545 B1 | 1/2002 | Klemarczyk et al. |
| 6,437,069 B1 | 8/2002 | Yokoyama |
| 6,528,160 B1 | 3/2003 | Takushima |
| 6,531,180 B1 | 3/2003 | Takushima et al. |
| 6,570,714 B2 * | 5/2003 | Soane et al. ................... 359/646 |
| 6,573,348 B2 | 6/2003 | Yokoyama et al. |
| 6,632,500 B1 | 10/2003 | Takahashi |
| 6,663,978 B1 * | 12/2003 | Olson et al. ................... 428/523 |
| 6,760,533 B2 | 7/2004 | Nakamura et al. |
| 7,074,847 B2 | 7/2006 | Doi et al. |
| 7,122,253 B2 | 10/2006 | Yamaguchi et al. |
| 7,307,107 B2 * | 12/2007 | Imai et al. ........................ 522/97 |
| 7,439,278 B2 | 10/2008 | Jallouli |
| 7,463,417 B2 | 12/2008 | Duncan et al. |
| 7,556,843 B2 | 7/2009 | Kura et al. |
| 7,576,167 B2 | 8/2009 | Mori et al. |
| 7,632,880 B2 * | 12/2009 | Li et al. ......................... 524/115 |
| 2006/0241220 A1 * | 10/2006 | Li et al. ......................... 524/199 |
| 2009/0256977 A1 | 10/2009 | Haddock et al. |

FOREIGN PATENT DOCUMENTS

| | | |
|---|---|---|
| EP | 1388852 A1 | 11/2004 |
| JP | 1067970 | 3/1998 |
| WO | WO 01/30933 A1 | 5/2001 |
| WO | WO 2004074884 A1 * | 9/2004 |

OTHER PUBLICATIONS

Idacavage, Mike J. Halogen-Free, UV-Curable High Refractive Index Materials for Light Management. Cytec Industries, Inc. Straregy Technology Group. From Cytec Industrusies, Inc. Georgia Tech Nano@Tech Seminar Series. (2010). Retrieved from Internet on [Sep. 27, 2013]. Retrieved from <URL:https://smartech.gatech.edu/bitstream/handle/1853/35474/>:.*
R.P. Winkler et al, "New UV-Curable Adhesives with Variable Refractive Index Based on Inorganic-Organic Nanocomposites (NANOMER®) For Otpical Components" 9th Cimtec-World Ceramics Congress, pp. 689-696, (1999).
T. Koch et al, "UV-Curable Epoxy Based Nanocomposite Adhesive for Applications in Integrated Optics" 9th Cimtec-World Ceramics Congress, pp. 681-388, (1999).
J. Tour et al, "Self-Assembled Monolayers and Multilayers of Conjugated Thiols, α, Ω-Dithiols, and Thioacetyl-Containing Adsorbates. Understanding Attachments between Potential Molecular Wires and Gold Surfaces," J. Am. Chem. Society 1995, 117, pp. 9529-9534.
C.G. Khan Malek et al, "Adhesiion promotion between poly(methylmethacrylate) and metallic surfaces for LiGA evaluated by shear stress measurements" J. Vac. Sci. Technol. B 16(6), Nov./Dec. 1998, pp. 3543-3546.
J. I. Henderson et al, "Self-assembled monolayers of dithiols, diisocyanides, and isocyanothiols on gold: 'chemically sticky' surfaces for covalent attachment of metal clusters and studies of interfacial electron transfer" Inorganica Chimica Acta 242 (1996), pp. 155-124.

(Continued)

Primary Examiner — Sanza McClendon
(74) Attorney, Agent, or Firm — Sterne Kessler Goldstein & Fox P.L.L.C.

(57) ABSTRACT

Curable adhesive compositions are provided that exhibit a high refractive index.

36 Claims, No Drawings

(56) References Cited

OTHER PUBLICATIONS

R. G. Osifchin et al, "Single Electron Tunneling in Molecular Nanostructures of Single Crystal Gold Clusters Attached by Dithols to Au(111): Direct I(V) Measurements of Individual Surface Attached Gold Clusters by STM" Polym. Mat. Sci. Eng. (1995) 73, pp. 208-209.

W. Deng et al, "Multi-Layer Formation of Copper Ions ($Cu^{2+}$) Deposited onto Self-Assembled Monolayers of Alkanedithiols on Au (111) Surfaces,"Jpn. J. Appl. Phys. vol. 39 (2000) pp. L751-L754.

Kojima et al, "Studies on Adhesion of Functional Monomers with SH Group to Tooth Substrates and Dental Alloys", Div. Of Organic Material, Institue for Medical and Dental Engineering, 1986, vol. 5, No. 1, pp. 92-105.

Atsuta et al. "Bonding fixed prosthodontic composite resin and precious metal alloys with the use of vinyl-thiol primer and an adhesive opaque resin"The Journal of Prosthetic Dentistry, Mar. 1992, vol. 67, No. 3, pp. 296-300.

W. Huang et al, "Surface-Initiated Thermal Radical Polymerization on Gold" American Chemical Society, Langmuir 2001, 17, pp. 1731-1736.

H. Rieley et al, "Photo-oxidation and photo-reduction in alkyltmol monolayers self-assembled on gold" J. Chem. Soc., Faraday Trans., 1996, 92(19), pp. 3629-3624.

M. Glodde et al, "Adhesion promotors for gold: Bis-($\Omega$-aminoalkyl)-disulfides" 1998 Elsevier Science Ltd., 18(1998), pp. 359-364.

R. G. Schmidt et al, "Investigation of Steel/Epoxy Adhesion Durability Using Polymeric Coupling Agents III. Influence of Coupling Agent Layer Thickness" J. Adhesion 1989, vol. 27, pp. 135-142.

D. B. Yang et al, "Polarized Grazing Angle FTIR Study of Molecular Orientation and Bonding of Thioglycolates at the Metal Interface" Surf. Interface Analysis, (1996), 24(12), 803-810.

Notification of Reasons for Rejection for Japanese Patent Application No. 2012-504918, Japanese Patent Office, mailed Dec. 10, 2013, 5 pages (with English translation).

\* cited by examiner

CURABLE ADHESIVE COMPOSITIONS

CROSS-REFERENCES TO RELATED APPLICATIONS

This application claims the benefit of U.S. Provisional Patent Application Nos. 61/168,401 filed Apr. 10, 2009; 61/229,031 filed Jul. 28, 2009; and 61/234,536 filed Aug. 17, 2009, each of which is incorporated by reference herein in its entirety.

FIELD OF THE INVENTION

The present invention relates to curable laminating adhesives. More particularly, the present invention is directed to UV curable adhesive compositions having a refractive index that matches the refractive index of one or more substrates.

BACKGROUND OF THE INVENTION

Adhesives have been widely used in various industries for many years, and numerous adhesives are commercially available. But finding a suitable commercially available adhesive to meet certain requirements is not always possible. In some cases, a suitable adhesive can be designed to meet particular specifications, and can take advantage of the availability of new monomers, additives, curing agents and new advanced in polymer processing technology.

Curable adhesives are well known. These include adhesives that are curable by radiation generally, as well as those that are curable by ultraviolet or visible light in particular. Unfortunately, known curable adhesives may suffer from a number of disadvantages. For example, many adhesives suffer from insufficient adhesion and/or inappropriate refractive index to match the refractive indices of the intended substrates. Many adhesives have a refractive index (RI) that is lower than 1.60, which is not suitable for lenses (e.g., electroactive lenses or composite lenses) made of plastic materials having an RI of 1.67 or higher. While there are a few adhesive compositions with high RI, they suffer from poor adhesion, unsuitable viscosity, or poor batch life. Some adhesives also require the use of solvents that must be evaporated during curing, and thus are not suitable for one or more electro-active assembly processes.

A need therefore exists for curable adhesives, especially UV curable adhesives, that exhibit a high RI, and preferably improved adhesion and viscosity.

BRIEF SUMMARY OF THE INVENTION

In one embodiment, curable adhesive compositions are provided that exhibit a high refractive index, acceptable viscosity, and/or acceptable adhesion. In another embodiment, devices are provided that include the adhesive composition disposed between two substrates.

In one embodiment, the curable adhesive composition comprises at least one high index-high viscosity component having a refractive index, before curing, of at least 1.56 at 25° C., and a viscosity, before curing, of at least 15,000 cP at 25° C., and a photoinitiator. The adhesive composition has a refractive index, after curing, of greater than 1.50. In one aspect, the adhesive composition is curable by ultraviolet radiation.

The high index-high viscosity component may be an aromatic urethane acrylate (e.g., brominated aromatic urethane acrylate), tribromophenyl acrylate, or 9,9-bis{4-(2-acryloyloxyethoxy)phenyl}fluorene.

The photoinitiator may include a radical photoinitiator, a cationic photoinitiator, or an anionic photoinitiator.

The radical photoinitiator may be selected from the non-limiting group of bis(2,3,6-trimethlbenzoyl)-phenylphosphineoxide, 1-hydroxcyclohexylphenylketone, 2-hydroxy-2-methyl-1-phenyl-propan-1-one, bis(2,6-dimethoxybezoyl)-2,4,4-trimethylpentyl phosphe-ine oxide, 2,4,6-trimethylbezoyldiphenylphosphine, 2,2-dimethoxy-2-phenylacetophenone, 4-(2-hydroxyethoxy)phenyl-(2-hydroxy-2-methlpropyl)ketone, 2-methyl thioxanthone, 2-isopropyl thioxanthone, 2-chloro thioxanthone, thoxanthone, xanthene, bezophenoe, 2-methyl-1-[4-methylthio)phenyl]-2-morpholino propan-1-one, and 2-benzyl-2-N,N-dimethlamino-1-(-morpholinophenyl)-1-butanone. Preferably, the radical photoinitiator is at least one of bis(2,3,6-trimethlbenzoyl)-phenylphosphineoxide, 1-hydroxcyclohexylphenylketone, or 2-hydroxy-2-methyl-1-phenyl-propan-1-one.

The cationic photoinitiator may be selected from the non-limiting group of triaryl sulfonium salt hexafluoroantimonate, triaryl sulfonium hexafluorophosphate, bis(4-diphenylsulfonio)-phenyl]sufide-bis-hexafluorophosphate, di(alkylphenyl) iodonium salt, diaryl iodonium hexafluoroantimonate, and iron-arene complex.

The anionic photoinitiator may be selected from the non-limiting group of O-nitrobenzyl derivatives, metal amine complexes, (cyclopentadienyl) ruthenium complexes, and (cyclopentadienyl) osmium complexes.

In another embodiment, the photoinitiator comprises at least one additive, such as a co-catalyst, a phosphine, and/or an amine. The additive can be phosphonium salts, tera alkylphosphonium bromide, tera alkylphosphonium chloride, triphenyl phosphine, trimethoxy phenyl phosphine, trichloro phenyl phosphine, alkyl amine primary, dialkyl amine, or trialkyamine.

In one embodiment, the composition includes at least one vinyl resin (e.g., NTT #6205).

In another embodiment, the composition contains at least one sulfur component, including, without limitation, 2-bis(2-mercapto ethylthio)-3-mercapto propane, trimethylolpropane tris(3-mercaptopropionate), 2-mercaptoethylthio-3-propanthiol sulfide, pentaerythritol tetrakis(2-mercaptopropoinate), 2,2'-thiodiethanethiol, trimethyloltris(3-mercaptopropoinate)oethylthio-3 propanthiol sulfide, 2,5-dimercaptomethyl-1,4-dithiane, 4,5-(mercaptomethylthio)-1,3-dithiolane, 4,6-(mercaptomethylthio)-1,3-dithiane, 1,1,3,3-tetra(mercaptomethylthio)propane, 2,3-episulfide propanyl disulfide, and 2,3-episulfide propanyl sulfide.

In another embodiment, the composition contains at least one acrylic component, including, without limitation, polyethylene glycol o-phenyl phenyl ether acrylate, urethane acrylate, aliphatic urethane acrylate, acrylic oligomer, 2(2-ethoxyethoxy)ethyl acrylate, 2-phenoxyethyl acrylate, ethoxylated (4) trimethylolpropane triacrylate, ethoxylated (6) trimethylolpropane triacrylate, isobornyl acrylates, glycidyl methacrylate, 1,6 hexanediol diacrylate, alkoxylated phenol acrylate, alkoxylated phenol diacrylate, 2 hydroxyethyl acrylate, phenylthioethylacrylate, alkoxylated nonylphenol acrylate, ethoxlyated tribromo phenyl acrylate, tetrahydrofurfuryl acrylate, tetrahydrofurfuryl methacrylate, and polyethylene glycol (200) diacrylate. In one embodiment, the composition contains urethane acrylate.

In another embodiment, the composition contains a bisphenol A, including, without limitation, ethoxylated (10) bisphenol A diacrylate, ethoxylated (4) bisphenol A diacrylate, ethoxylated (4) bisphenol A dimethacrylate, diallylether bisphenol A, and ortho diallyl bisphenol A.

In another embodiment, the composition contains at least one naphthalene component including, without limitation, 1-chloro naphthalene, 1-bromo naphthalene, and 1-naphthaldehyde.

In another embodiment, the composition contains at least one epoxy resin including, without limitation, poly[(phenyl glycidyl ether)-co-formaldehyde]oligomeric epoxide and epoxy acrylates.

In one embodiment, the adhesive composition has a refractive index, after curing, of about 1.60 to about 1.74. These compositions can contain about 0.01 wt % to about 5 wt % of at least one photoinitiator and about 1 wt % to about 70 wt % of at least one high index-high viscosity component selected from the group consisting of brominated aromatic urethane acrylate; tribromophenyl acrylate; and 9,9-bis{4-(2-acryloyloxyethoxy)phenyl}fluorene. The photoinitiator may include one or more of bis(2,3,6-trimethlbenzoyl)-phenylphosphineoxide, triaryl sulfonium salt hexafluoroantimonate, and triaryl sulfonium hexafluorophosphate. The adhesive composition may also contain about 10 wt % to about 95 wt % of at least one vinyl resin.

These adhesive compositions may also contain about 2 wt % to about 50 wt % of at least one acrylic component selected from the group consisting of polyethylene glycol o-phenyl phenyl ether acrylate; urethane acrylate; acrylic oligomer; isobornyl acrylates; phenylthioethylacrylate; and ethoxlyated tribromo phenyl acrylate.

These adhesive compositions may also contain at least one sulfur component selected from the non-limiting group consisting of 1,2-bis(2-mercapto ethylthio)-3-mercapto propane; trimethylolpropane tris(3-mercaptopropionate); 2-mercaptoethylthio-3-propanthiol sulfide; pentaerythritol tetrakis(2-mercaptopropoinate); 2,2'-thiodiethanethiol; trimethyloltris(3-mercaptopropoinate)oethylthio-3 propanthiol sulfide; 2,5-dimercaptomethyl-1,4-dithiane; 4,5-(mercaptomethylthio)-1,3-dithiolane; 4,6-(mercaptomethylthio)-1,3-dithiane; 1,1,3,3-tetra(mercaptomethylthio)propane; 2,3-episulfide propanyl disulfide; and 2,3-episulfide propanyl sulfide. Preferably, the composition comprises about 1 wt % to about 30 wt % of at least one sulfur component selected from the group consisting of 1,2-bis(2-mercapto ethylthio)-3-mercapto propane; trimethylolpropane tris(3-mercaptopropionate); 2-mercaptoethylthio-3-propanthiol sulfide; pentaerythritol tetrakis(2-mercaptopropoinate); and 2,2'-thiodiethanethiol.

These adhesive compositions may also contain about 5 wt % to about 25 wt % of at least one at least one naphthalene component selected from the group consisting of 1-chloro naphthalene; 1-bromo naphthalene; and 1-naphthaldehyde.

These adhesive compositions may also contain a bisphenol A component selected from the group consisting of diallylether bisphenol A and ortho diallyl bisphenol A.

These adhesive compositions may also contain an epoxy resin selected from the group consisting of poly[(phenyl glycidyl ether)-co-formaldehyde]oligomeric epoxide; and epoxy acrylates.

In another embodiment, the adhesive composition has a refractive index, after curing, of about 1.55 to about 1.60. These compositions can contain about 0.01 wt % to about 5 wt % of at least one photoinitiator; about 10 wt % to about 60 wt % of at least one high index-high viscosity component selected from the group consisting of brominated aromatic urethane acrylates; tribromophenyl acrylate; and 9,9-bis{4-(2-acryloyloxyethoxy)phenyl}fluorine; and about 1 wt % to about 60 wt % of at least one acrylic component selected from the group consisting of 2-(2-ethoxyethoxy)ethyl acrylate; 2-phenoxyethyl acrylate; ethoxylated (4) trimethylolpropane triacrylate; ethoxylated (6) trimethylolpropane triacrylate; alkoxylated phenol acrylate; 2 hydroxyethyl acrylate; polyethylene glycol o-phenyl phenyl ether acrylate; urethane acrylate; isobornyl acrylates; and alkoxylated nonylphenol acrylate.

In one embodiment, these adhesive compositions can contain about 0.01 wt % to about 5 wt % of at least one photoinitiator selected from the group consisting of bis(2,3,6-trimethlbenzoyl)-phenylphosphineoxide; 1-hydroxcyclohexylphenylketone; and 2-hydroxy-2-methyl-1-phenyl-propan-1-one; about 10 wt % to about 60 wt % of at least one high index-high viscosity component selected from the group consisting of brominated aromatic urethane acrylates; and about 1 wt % to about 60 wt % of at least one acrylic component selected from the group consisting of 2(2-ethoxyethoxy)ethyl acrylate; 2-phenoxyethyl acrylate; ethoxylated (4) trimethylolpropane triacrylate; ethoxylated (6) trimethylolpropane triacrylate; alkoxylated phenol acrylate; and 2 hydroxyethyl acrylate.

These adhesive compositions may also contain a sulfur component selected from the group consisting of 2-mercaptoethylthio-3-propanthiol sulfide; 2,2'-thiodiethanethiol; and trimethyloltris(3-mercaptopropoinate)oethylthio-3 propanthiol sulfide.

These adhesive compositions may also contain an epoxy resin (e.g., epoxy acrylates).

These adhesive compositions may also contain a bisphenol A component selected from the group consisting of ethoxylated (10) bisphenol A diacrylate; ethoxylated (4) bisphenol A diacrylate; and ethoxylated (4) bisphenol A dimethacrylate.

These adhesive compositions may also contain triallyl isocyanurate.

In a yet another embodiment, the adhesive composition has a refractive index, after curing, of about 1.49 to about 1.55. These adhesive compositions can contain about 0.01 wt % to about 5 wt % of at least one photoinitiator; and about 5 wt % to about 80 wt % of at least one acrylic component selected from the group consisting of aliphatic urethane acrylate; acrylic oligomer; ethoxylated (4) trimethylolpropane triacrylate; ethoxylated (6) trimethylolpropane triacrylate; glycidyl methacrylate; 1,6 hexanediol diacrylate; alkoxylated phenol acrylate; alkoxylated phenol diacrylate; 2 hydroxyethyl acrylate; alkoxylated nonylphenol acrylate; ethoxylated (10) bisphenol A diacrylate; 2-phenoxyethyl acrylate; isobornyl acrylates; tetrahydrofurfuryl acrylate; tetrahydrofurfuryl methacrylate; and polyethylene glycol (200) diacrylate.

In one embodiment of these adhesive compositions, the acrylic component is selected from the non-limiting group of aliphatic urethane acrylate; acrylic oligomer; ethoxylated (4) trimethylolpropane triacrylate; ethoxylated (6) trimethylolpropane triacrylate; glycidyl methacrylate; 1,6 hexanediol diacrylate; alkoxylated phenol acrylate; 2 hydroxyethyl acrylate; alkoxylated nonylphenol acrylate; and ethoxylated (10) bisphenol A diacrylate.

These adhesive compositions may also contain about 10 wt % to about 50 wt % of at least one high index-high viscosity component (e.g., brominated aromatic urethane acrylates).

These adhesive compositions may also contain a sulfur component selected from the group consisting of trimethylolpropane tris(3-mercaptopropionate) and pentaerythritol tetrakis(2-mercaptopropoinate).

In another embodiment, a device is provided. The device comprises a first and second substrate, e.g., ophthalmic component, and a curable adhesive composition (as described in any of the embodiments) disposed between the first and second ophthalmic components. The refractive index of the adhesive composition, after curing, is i) about equal to the refractive index of at least one of the first ophthalmic component and the second ophthalmic component, ii) between the refractive index of the first lens and the refractive index of the second lens, or iii) about equal to the average refractive index of the first ophthalmic component and the second ophthalmic component. In one embodiment, the refractive index of the adhesive composition, after curing, is within 0.03 of the refractive index of at least one of the first ophthalmic component and the second ophthalmic component. In another embodiment, at least one of the first ophthalmic component and the second ophthalmic component has a refractive index of about 1.67.

Additional features, advantages, and embodiments of the invention may be set forth or apparent from the following detailed description and claims. Moreover, both the foregoing summary of the invention and the following detailed description are exemplary and intended to provide further explanation without limiting the scope of the invention as claimed.

DETAILED DESCRIPTION OF THE INVENTION

In one embodiment, curable adhesive compositions are provided that exhibit a high refractive index, acceptable viscosity, and/or acceptable adhesion. Devices are also provided that include the adhesive composition disposed between two substrates.

An exemplary assembly process for fabricating electro-active lenses is described in U.S. Publication 2009/0256977, which is hereby incorporated by reference in its entirety. A portion of the assembly process can include two preformed plastic lenses, one of which has a lens surface comprising a diffractive pattern filled with electro-active material (i.e., liquid crystal), that are subsequently bonded together. Because of the diffractive pattern, the laminate surfaces can generate a thin cavity (e.g., in the range of 30-70 microns thick). The thickness of this cavity can depend on the diffractive design.

Refractive Index

The cavity formed between the lens substrates can be filled with a UV curable adhesive composition having a refractive index (RI) that matches the RI of the preformed lenses to hide the seal features. If the two preformed lenses have different RIs, the value of RI of the adhesive composition can be between (e.g., an average of) the two RIs of the preformed lenses) to reduce or eliminate light interference due to the difference in RI of the two preformed lenses. For example, when adhering a polycarbonate lens (RI 1.58) to a Trivex® lens (RI 1.53), a suitable adhesive composition can have an RI, after curing, of about 1.55. The compositions may be suitable for adhering a wide variety of lens materials, including electro-active lenses and composite lenses. In some embodiments, the adhesives are particularly suitable for use with plastic materials having an RI of about 1.67 or higher. The adhesives may be used to laminate one or more of the following substrate materials: polycarbonate (RI 1.58), Trivex® (RI 1.53), and MR-10 (RI 1.67). The laminated substrates may be the same as, or different from, one another.

Unless otherwise specified, the refractive index of the adhesive composition is reported after curing at 25° C. (Curing increases the RI of the adhesive composition by about 0.01-0.05, more specifically about 0.03.) In contrast, unless otherwise specified, the RI of the individual components of the adhesive are reported before curing at 25° C.

The adhesive compositions provided herein have a refractive index of at least 1.49, preferably at least 1.50, 1.53, 1.55, 1.56, 1.57, 1.60, 1.63, 1.65, 1.67, or 1.70. The adhesive compositions described herein are categorized as high index, mid-index, and low index adhesives (see Examples), but such distinctions are used merely to categorize the compositions relative to one another. All of the compositions described herein, including the "low" and "mid" index examples, have a refractive index that is higher than most typical adhesives. The low index adhesives described herein have a refractive index of about 1.49 to about 1.55. The mid-index adhesives have a refractive index of about 1.55 to about 1.6. The high index adhesives have a refractive index of about 1.6 to about 1.74.

Viscosity

Viscosity of an adhesive composition is an important parameter that affects manufacturing. Viscosity is not a predictable feature of a composition; it can not be calculated strictly by weight average. For example, although adding a low viscosity component to a composition will dilute the viscosity of the composition, the precise reduction in viscosity cannot be predicted based on the amount, e.g., percent weight, and viscosity of the individual component added. Accordingly, achieving an acceptable viscosity of the adhesive composition requires an understanding of the manufacturing process to be employed as well as the balancing of the various adhesive components as taught herein.

Accordingly, the curable adhesive can have a predetermined or desired viscosity value to flush away the excess liquid crystal that may overflow into the cavity during the assembly process. As an example, compositions with viscosity of about 100 cP or less may break the diffractive seal during the filling process and consequently could contaminate the electro-active material inside the diffractive pattern. But low viscosity adhesive compositions may be suitable to laminate two preformed lenses that do not comprise diffractive patterns. Preferably, the viscosity of the adhesive composition, before curing, is about 200 to about 5000 cP, about 1000 to about 3000 cP, or about 1000 to about 2000 cP.

The adhesive compositions provided herein can also be used in surface casting, which includes applying the adhesive composition to one preformed lens and then casting another lens on the top of the original preformed lens.

Adhesion

Adhesion performance is also a high priority. For a strong, durable bond, the adhesive compositions can be designed to avoid frozen-in stresses and voids, which can be caused by adhesive shrinkage. In general, the lower the shrinkage rate, the better the adhesion. To reduce shrinkage rate, the adhesive can comprise monomers with a lower number of reactive functional groups, or they can comprise high molecular weight oligomers or pre-polymers. It is desired for the adhesive composition to be able to wet and spread on a substrate surface. This molecular-level contact allows the forces of adhesion to develop, removes entrapped air from the interface, and maximize the area over which bond can develop. For a clean, smooth substrate, wetting and spreading is governed by the surface tensions of the two materials. The lower the surface tension of the adhesive, the better the wetting. Aside from surface tension, surface preparation, especially of plastic substrates, is an important step to improve adhesion performance. Methods such as chemical etching and plasma can be used to improve the adhesion performance of the adhesive compositions. Another efficient method to improve adhesion performance of the adhesive compositions is to treat the surface with functionalized alkoxysilanes, such as acryloxy trimethoxy silane.

The adhesive compositions described herein can be formed as blends of reactive monomers, oligomers or pre-polymers, photoinitiator(s), and optional silane coupling agent. In particular, the adhesive compositions can contain a high index-high viscosity component and a photoinitiator.

Reactive Monomers, Oligomers, and Pre-Polymers

In one embodiment, the curable adhesive composition contains at least one high index-high viscosity component having a refractive index, before curing, of at least 1.56 at 25° C., and a viscosity, before curing, of at least 15,000 cP at 25° C. In one embodiment, the high index-high viscosity component has a refractive index of at least about 1.58, 1.60, or 1.62. In one embodiment, the high index-high viscosity component has a viscosity of at least about 20,000, 40,000, 60,000, 70,000, 80,000, or 90,000 cP at 25° C. Exemplary high index-high viscosity components include, but are not limited to, aromatic urethane acrylate (e.g., brominated aromatic urethane acrylate), tribromophenyl acrylate, or 9,9-bis{4-(2-acryloyloxyethoxy)phenyl}fluorene. A high index-high viscosity component (or a combination of more than one high index-high viscosity components) can be present in an amount of about 1 to about 70%, about 10 to about 60%, about 10% to about 50%, about 10% to about 30%, or about 10% to about 20%.

The selection of the resin, in addition to good adhesion, can be made to establish mainly the refractive index match between the cured composition and the substrates. In the case of laminating two preformed lenses with one comprising a diffractive pattern, the RI match should be the same or very close, e.g., within 0.02, to hide the diffractive seal features. For example, when laminating two plastic lenses made of RI of 1.67 with a diffractive pattern, the RI of the adhesive composition can be about 1.64 to about 1.70. Even though some commercially available adhesives may exhibit a high RI, they often exhibit poor adhesion. For example, a formulation made of 100% composition #8323 or 100% composition of #6205 (supplied by NTT Advanced Technology Corp.), the adhesion performance is very poor, and furthermore, the adhesive broke the diffractive seal and contaminated the liquid crystal inside the diffractive region.

Resin blends were prepared that are suitable for use in laminating preformed high refractive lenses, such as lenses manufactured from MR-10 (RI=1.67). In one embodiment, an adhesive for bonding two MR-10 lenses contains:
5-60% vinyl resin (NTT #6205),
10-50% 9,9-Bis[-4-(2-acryloxyethoxy)phenyl]Fluorene (NKE A-BPEF supplied by Kowa American Corp.)
10-50% Tribromophenyl acrylate (BR-30 supplied by Kowa)
0-20% Aromatic monoacrylate oligomer (CN-131B supplied by Sartomer}
0-30% of a sulfur component, and
0.01-5% Phenyl bis(2,4,6-trimethyl benzoyl) phosphine oxide (Irgacure 819 supplied by Ciba).

Unless otherwise specified, component amounts, here and throughout the specification, are provided as weight percents of the total composition.

In this formulation, if the amount of NTT #6205 is less than 5%, the final RI of the adhesive composition may be too low, and there may be insufficient RI match to the MR-10 preformed lenses. On the other hand, if the amount of NTT #6205 is higher than 60%, then the RI may be too high, and the adhesion performance becomes poor.

A sulfur component, e.g., a multifunctional thiol resin, provides the film with, in addition to high RI, desirable mechanical properties that improve adhesion. The exemplary resin blend described above suitable for laminating MR-10 lenses may include as the sulfur component:
2-Mercaptoethylthio-3propane sulfide (supplied by Mitsui);
1,2-Bis(2-mercaptoethyl)-3-mercaptopropane (supplied by Mitsui);
2,5-dimercaptomethyl-1,4 dithiane (supplied by Sigma-Aldrich);
2,2'-Thiodiethanthiol (supplied by Sigma-Aldrich);
Trimethylol propane tris3-mercaptopropoinate and/or 2,mercaptoethylthio 3-propanethiol sulfide; or
2,5-dimercaptomethyl-1,4-dithiane; Pentaerythritol tetrakis-3-mercaptopropoinate; and/or 2,3-mercapto propane.

Another exemplary composition includes: 20-60% composition #8323 (supplied by NTT), 10-50% CN-2600, 10-20% NKE-10, and 0.01-5% Irgacure 819

Other exemplary compositions include 30-60% vinyl resin (NTT #6205) and 0.01-5% Irgacure 819, as well as: 20-40% CN-2600, and 10-50% NK-A-BPEF (supplied by Kowa); or 30-65% Vinyl Naphthalene, 0-70% CN-2600, 0-50% 1,2-bis (2-mercapto ethyl thio) propane, and 0-70% NK-A-BPEF.

Yet other exemplary compositions include 0-40% vinyl resin (NTT #6205) and 0.01-5% Irgacure 819, as well as:
10-50% 1,2-bis(2-mercapto ethyl thio) propane (supplied by Mitsui Chemical), 5-40% Chloro Naphthalene and/or Naphthaldehyde, 0-20% CN-2600, and 0-70 NK-A-BPEF;
30-70% of 2,3-Episulfide propane sulfide (supplied by MGC), 30-70% CN-2600, 0-20% NK-A-BPEF, and 0-10% NKE-10; or
10-40% 1,2-bis(2-mercapto ethyl thio) propane (supplied by Mitsui Chemical), 5-40% CN-2600, and 20-50% NK-A-BPEF-10.

Resin blends suitable for use in surface casting Trivex® to preformed MR-10 lenses can include 30-70% CN-2600 and 30-70% NK-10.

Resin blends suitable for use in surface casting Trivex® to preformed polycarbonate lenses can include 5-50% CN-2600, 5-15% Ethoxylated (6)trimethylolpropane triacrylate (SR 499), 20-50% Ethoxylated(4)bisphenol A diacrylate (SR601), 5-15% 2-Hydroxy ethyl acrylate, and 5-10% Alkoxylated phenol acrylate (D9088).

Commercially available components that may be useful for preparing the curable adhesive compositions include, but are not limited to:
High refractive index resins #6205, #8322 and #8323 (NTT Advanced Technology Corp.)
Polyethylene glycol O-phenyl phenyl ether acrylate (NKE-10); 9,9 Bis[4-(2-acryloxyethoxy)phenyl fluorene (NK A-BPEF); and tribromophenyl acrylate (Kowa American Corp.)
Brominated aromatic urethane acrylates oligomer (CN-2600) (Sartomer).
1-vinyl Naphthalene, 2-vinyl Naphthalene, 1-chloro Naphthalene, and N-vinyl carbazole (Sigma-Aldrich).
Divinyl Benzene, 2,6-diphenyl-1,4-phenylene oxide, diphenyl methane bis(4-phenyl)carbamate, alpha-nephthyl methacrylate, alpha-naphthyl, carbonyl methacrylate, beta-naphthyl methacrylate, and styrene sulfide (Scientific Polymer Products, Inc.)
2,3-Episulfide propane sulfide (supplied by MGC)
2,3-Episulfide propane disulfide, 1,2-bis(2-mercaptoethylthio)-3mercaptopropane, and 2-mercaptoethyl sulfide (Mitsui Chemicals)
Acrylic oligomer (CN131B), Epoxy acrylate oligomer (CN110), Epoxy methacrylate (CN151), Ethoxylated (3)-bisphenol A diacrylate (SR349), Ethoxylated (2) bisphenol A dimethacrylate (SR348), Ethoxylated (4) bisphenol A diacrylate (SR601), 2-Phenoxyethyl acrylate (SR339), Alkoxylated phenol acrylate (D9088), Ethoxylated (2) bisphenol A dimethacrylate SR101, Ethoxylated (6) bispehenol A dimethacrylate (SR504), Alkoxylated phenol acrylate (SR614), Ethoxylated (6) trimethylolpropane triacrylate (SR499), Alkoxylated aliphatic diacrylate (SR9209), Polyethylene glycol(400)diacrylate (SR344), 1,6 Hexanediol diacrylate (SR239), Tetrahydrofurfuryl acrylate (SR285), Isobornyl Acrylat (SR506A), Tetrahydrofurfuryl methacrylate (SR203), and Ethoxylated (10) bisphenol A diacrylate (SR602) (Sartomer).

Photoinitiators

The photoinitiator absorbs light and is responsible for the production of free radicals in a free radical polymerized system or cations in a cationic photoinitiated system. There are many photoinitiators commercially available, and a suitable photoinitiator can be selected by considering the following factors:
1) The types of base resin employed: Free radical polymerized resin or cationic polymerized resin.
2) The radiation source: The absorption bands of the photoinitiators should generally substantially overlap the emission spectra of the light source.
3) The absorption bands of the lens laminate: The adhesive can be used to bond two substrates, e.g., preformed transparent plastic lenses. One or both substrates may block UV block light (a common practice for eye protection from sunlight). In this case, the absorption band of the photoinitiator can be outside the absorption band of the substrates.

The photoinitiator concentration can be about 0.01 to about 10%, preferably about 0.01 to about 5%, about 0.1 to about 3%, or about 0.1 to about 1.5%.

Preferred components of the photoinitiator system include one or more of:
Phenyl bis(2,4,6-trimethyl benzoyl) phosphine oxide (Irgacure 819),
1-Hydroxy cyclohexyl phenyl-ketone (Irgacure 184),
2-Hydroxy 2-methyl 1-phenyl 1-propane (Daracure 1173),
Triaryl sulfonium salt hexafluoroantimonate and triaryl sulfonium hexafluorophosphate (Cyracure® UVI-6976).

The photoinitiator may include a radical photoinitiator, a cationic photoinitiator, or an anionic photoinitiator.

Radical photoinitiator include, but are not limited to, bis(2,3,6-trimethlbenzoyl)-phenylphosphineoxide, 1-hydroxcyclohexylphenylketone, 2-hydroxy-2-methyl-1-phenyl-propan-1-one, bis(2,6-dimethoxybezoyl)-2,4,4-trimethylpentyl phosphe-ine oxide, 2,4,6-trimethylbezoyldiphenylphosphine, 2,2-dimethoxy-2-phenylacetophenone, 4-(2-hydroxyethoxy)phenyl-(2-hydroxy-2-methlpropyl)ketone, 2-methyl thioxanthone, 2-isopropyl thioxanthone, 2-chloro thioxanthone, thoxanthone, xanthene, bezophenoe, 2-methyl-1-[4-methylthio)phenyl]-2-morpholino propan-1-one, and 2-benzyl-2-N,N-dimethlamino-1-(-morpholinophenyl)-1-butanone.

Preferred exemplary radical photoinitiators include bis(2,3,6-trimethlbenzoyl)-phenylphosphineoxide, 1-hydroxcyclohexylphenylketone, and 2-hydroxy-2-methyl-1-phenyl-propan-1-one.

Cationic photoinitiators include, but are not limited to, triaryl sulfonium salt hexafluoroantimonate; triaryl sulfonium hexafluorophosphate, bis(4-diphenylsulfonio)-phenyl] sufid-bis-hexafluorophosphate, di(alkylphenyl) iodonium salt, diaryl iodonium hexafluoroantimonate, and iron-arene complex.

Anionic photoinitiators include, but are not limited to, O-nitrobenzyl derivatives, metal amine complexes, (cyclopentadienyl) ruthenium complexes, and (cyclopentadienyl) osmium complexes.

In one embodiment, the photoinitiator system includes at least one additive such as a co-catalyst, a phosphine, and/or an amine. Exemplary additives include, but are not limited to, phosphonium salts, tera alkylphosphonium bromide, tera alkylphosphonium chloride, triphenyl phosphine, trimethoxy phenyl phosphine, trichloro phenyl phosphine, alkyl amine primary, dialkyl amine, and trialkyamine.

Additional Adhesive Components

The adhesive composition may further contain up to about 10% of a partially or fully hydrolyzed silane coupling agent as an adhesion promoter/coupling agent. Exemplary silanes include, but are not limited to, 3-Methacryloxypropyl trimethoxysilane, 3-Amino-propyl trimethoxysilane, and 3-Glycidoxypropyltrimethoxysilane.

The composition may contain at least one vinyl resin. Without being bound by theory, it is believed that the vinyl resin advantageously exhibits a lower viscosity to dilute the high index-high viscosity component while simultaneously improving adhesion. A preferred vinyl resin is NTT #6205. The vinyl resin(s) can be present in an amount of, e.g., about 10 to about 95%, about 20 to about 60%, or about 30 to about 40%.

The composition may contain at least one sulfur component. Without being bound by theory, it is thought that the sulfur component improves adhesion. Exemplary sulfur components include, but are not limited to, 2-bis(2-mercapto ethylthio)-3-mercapto propane, trimethylolpropane tris(3-mercaptopropionate), 2-mercaptoethylthio-3-propanthiol sulfide, pentaerythritol tetrakis(2-mercaptopropoinate), 2,2'-thiodiethanethiol, trimethyloltris(3-mercaptopropoinate)oethylthio-3 propanthiol sulfide, 2,5-dimercaptomethyl-1,4-dithiane, 4,5-(mercaptomethylthio)-1,3-dithiolane, 4,6-(mercaptomethylthio)-1,3-dithiane, 1,1,3,3-tetra (mercaptomethylthio)propane, 2,3-episulfide propanyl disulfide, and 2,3-episulfide propanyl sulfide. The sulfur component(s) can be present in an amount of, e.g., about 1 to about 30%, about 5 to about 20%, or about 5 to about 10%.

The composition may contain at least one acrylic component. Without being bound by theory, it is believed that the acrylic component improves adhesion. Moreover, some acrylic components may also advantageously contribute to the high refractive index of the final composition. For example, aromatic acrylates, and particularly halogenated aromatic acrylates exhibit high RI. Exemplary acrylic components include, but are not limited to, polyethylene glycol o-phenyl phenyl ether acrylate, urethane acrylate, aliphatic urethane acrylate, acrylic oligomer, 2(2-ethoxyethoxy)ethyl acrylate, 2-phenoxyethyl acrylate, ethoxylated (4) trimethylolpropane triacrylate, ethoxylated (6) trimethylolpropane triacrylate, isobornyl acrylates, glycidyl methacrylate, 1,6 hexanediol diacrylate, alkoxylated phenol acrylate, alkoxylated phenol diacrylate, 2 hydroxyethyl acrylate, phenylthioethylacrylate, alkoxylated nonylphenol acrylate, ethoxlyated tribromo phenyl acrylate, tetrahydrofurfuryl acrylate, tetrahydrofurfuryl methacrylate, and polyethylene glycol (200) diacrylate. In one embodiment, the acrylic component includes a urethane acrylate. The acrylic component(s) can be present in an amount of, e.g., about 5 to about 80%, about 1 to about 60%, or about 2 to about 50%, about 5 to about 30%.

The composition may contain a bisphenol A Without being bound by theory, it is believed that the bisphenol A improves the mechanical properties of the adhesive composition by, e.g., preventing film breakdown. Exemplary bisphenol A components include, but are not limited to, ethoxylated (10) bisphenol A diacrylate, ethoxylated (4) bisphenol A diacrylate, ethoxylated (4) bisphenol A dimethacrylate, diallylether bisphenol A, and ortho diallyl bisphenol A. The bisphenol component(s) can be present in an amount of, e.g., about 1 to about 70%, about 5 to about 25%, or about 30 to about 60%.

The composition may contain at least one naphthalene component. Without being bound by theory, it is believed that the naphthalene component exhibits a relatively high refractive index (though not typically as high as the high index-high viscosity component) while exhibiting a lower viscosity to balance the high index-high viscosity component. Exemplary naphthalene components include, but are not limited to, 1-chloro naphthalene, 1-bromo naphthalene, and 1-naphthaldehyde. The naphthalene component(s) can be present in an amount of, e.g., about 5 to about 25% or about 10% to about 20%.

The composition may contain at least one epoxy resin. Exemplary epoxy resins include, but are not limited to, poly [(phenyl glycidyl ether)-co-formaldehyde]oligomeric epoxide and epoxy acrylates.

In some cases, particular components may be preferred depending on the desired refractive index outcome. To that end, preferred components for the low, mid-, and high index adhesives are provided. Numerous low, mid-, and high index adhesive compositions are also provided in the Examples.

The low index adhesives provided herein (RI of about 1.49 to about 1.55) generally comprise at least one acrylic component in addition to the photoinitiator and high index-high viscosity component. Preferred components include:
- about 0.01 wt % to about 5 wt % of at least one photoinitiator; and
- about 5 wt % to about 80 wt % of at least one acrylic component selected from the group consisting of aliphatic urethane acrylate; acrylic oligomer; ethoxylated (4) trimethylolpropane triacrylate; ethoxylated (6) trimethylolpropane triacrylate; glycidyl methacrylate; 1,6 hexanediol diacrylate; alkoxylated phenol acrylate; alkoxylated phenol diacrylate; 2 hydroxyethyl acrylate; alkoxylated nonylphenol acrylate; ethoxylated (10) bisphenol A diacrylate; 2-phenoxyethyl acrylate; isobornyl acrylates; tetrahydrofurfuryl acrylate; tetrahydrofurfuryl methacrylate; and polyethylene glycol (200) diacrylate; more particularly
- at least one acrylic component selected from the group consisting of aliphatic urethane acrylate; acrylic oligomer; ethoxylated (4) trimethylolpropane triacrylate; ethoxylated (6) trimethylolpropane triacrylate; glycidyl methacrylate; 1,6 hexanediol diacrylate; alkoxylated phenol acrylate; 2 hydroxyethyl acrylate; alkoxylated nonylphenol acrylate; and ethoxylated (10) bisphenol A diacrylate.

Additional preferred components for the low index adhesives include:
- about 10 wt % to about 50 wt % of at least one high index-high viscosity component selected from the group consisting of brominated aromatic urethane acrylates; and/or
- a sulfur component selected from the group consisting of trimethylolpropane tris(3-mercaptopropionate) and pentaerythritol tetrakis(2-mercaptopropoinate)

The mid-index adhesives provided herein (RI of about 1.55 to about 1.6) generally comprise at least one of an acrylic component in addition to the photoinitiator and high index-high viscosity component. Preferred components include:
- about 0.01 wt % to about 5 wt % of at least one photoinitiator; more particularly
- about 0.01 wt % to about 5 wt % of at least one radical photoinitiator selected from the group consisting of bis (2,3,6-trimethlbenzoyl)-phenylphosphineoxide; 1-hydroxcyclohexylphenylketone; and 2-hydroxy-2-methyl-1-phenyl-propan-1-one;
- about 10 wt % to about 60 wt % of at least one high index-high viscosity component selected from the group consisting of brominated aromatic urethane acrylates; tribromophenyl acrylate; and 9,9-bis{4-(2-acryloyloxyethoxy)phenyl}fluorine; more particularly
- about 10 wt % to about 60 wt % of at least one high index-high viscosity component selected from the group consisting of brominated aromatic urethane acrylates;
- about 1 wt % to about 60 wt % of at least one acrylic component selected from the group consisting of 2(2-ethoxyethoxy)ethyl acrylate; 2-phenoxyethyl acrylate; ethoxylated (4) trimethylolpropane triacrylate; ethoxylated (6) trimethylolpropane triacrylate; alkoxylated phenol acrylate; 2 hydroxyethyl acrylate; polyethylene glycol o-phenyl phenyl ether acrylate; urethane acrylate; isobornyl acrylates; and alkoxylated nonylphenol acrylate; more particularly
- about 1 wt % to about 60 wt % of at least one acrylic component selected from the group consisting of 2(2-ethoxyethoxy)ethyl acrylate; 2-phenoxyethyl acrylate; ethoxylated (4) trimethylolpropane triacrylate; ethoxylated (6) trimethylolpropane triacrylate; alkoxylated phenol acrylate; and 2 hydroxyethyl acrylate.

Additional preferred components for the mid-index adhesives include:
- a sulfur component selected from the group consisting of 2-mercaptoethylthio-3-propanthiol sulfide; 2,2'-thiodiethanethiol; and trimethyloltris(3-mercaptopropoinate) oethylthio-3 propanthiol sulfide;
- an epoxy resin selected from the group consisting of epoxy acrylates;
- a bisphenol A component selected from the group consisting of ethoxylated (10) bisphenol A diacrylate; ethoxylatedH (4) bisphenol A diacrylate; and ethoxylatedH (4) bisphenol A dimethacrylate; and/or
- triallyl isocyanurate.

The high index adhesives provided herein (RI of about 1.6 to about 1.74) generally comprise a photoinitiator and high index-high viscosity component. Preferred components include:
- about 0.01 wt % to about 5 wt % of at least one photoinitiator (e.g., bis(2,3,6-trimethlbenzoyl)-phenylphosphineoxide, triaryl sulfonium salt hexafluoroantimonate, and/or triaryl sulfonium hexafluorophosphate); and
- about 1 wt % to about 70 wt % of at least one high index-high viscosity component selected from the group consisting of brominated aromatic urethane acrylate; tribromophenyl acrylate; and 9,9-bis{4-(2-acryloyloxyethoxy)phenyl}fluorine.

In one embodiment, the high index adhesive includes at least one vinyl resin (e.g., NTT #6205). The vinyl resin may be present in an amount of, e.g., about 10 wt % to about 95 wt %.

Additional preferred components for the high index adhesives include:
- about 2 wt % to about 50 wt % of at least one acrylic component selected from the group consisting of polyethylene glycol o-phenyl phenyl ether acrylate; urethane acrylate; acrylic oligomer; isobornyl acrylates; phenylthioethylacrylate; and ethoxlyated tribromo phenyl acrylate;
- at least one sulfur component selected from the group consisting of 1,2-bis(2-mercapto ethylthio)-3-mercapto propane; trimethylolpropane tris(3-mercaptopropionate); 2-mercaptoethylthio-3-propanthiol sulfide; pentaerythritol tetrakis(2-mercaptopropoinate); 2,2'-thiodiethanethiol; trimethyloltris(3-mercaptopropoinate) oethylthio-3 propanthiol sulfide; 2,5-dimercaptomethyl-1,4-dithiane; 4,5-(mercaptomethylthio)-1,3-dithiolane; 4,6-

(mercaptomethylthio)-1,3-dithiane; 1,1,3,3-tetra (mercaptomethylthio)propane; 2,3-episulfide propanyl disulfide; and 2,3-episulfide propanyl sulfide, more particularly about 1 wt % to about 30 wt % of at least one sulfur component selected from the group consisting of 1,2-bis (2-mercapto ethylthio)-3-mercapto propane; trimethylolpropane tris(3-mercaptopropionate); 2-mercaptoethylthio-3-propanthiol sulfide; pentaerythritol tetrakis(2-mercaptopropoinate); and 2,2'-thiodiethanethiol;

about 5 wt % to about 25 wt % of at least one at least one naphthalene component selected from the group consisting of 1-chloro naphthalene; 1-bromo naphthalene; and 1-naphthaldehyde;

a bisphenol A component selected from the group consisting of diallylether bisphenol A; and ortho diallyl bisphenol A; and/or an epoxy resin selected from the group consisting of poly [(phenyl glycidyl ether)-co-formaldehyde]oligomeric epoxide; and epoxy acrylates.

Light Source

The adhesive compositions are curable by exposure to radiation (a light source), preferably ultraviolet or ultraviolet-visible light. Curing can be conducted after the lamination process, which means the light passes through the lens assembly to reach the adhesive. In cases where the lens assembly includes a UV blocker, the light source can provide emission bands of wavelengths longer than 400 nm such as Actinic light sources or LED light sources.

The exposure time required to cure the adhesive compositions can vary and can depend on the light source, photoinitiator concentration, and the distance of the source from the substrate. One of ordinary skill in the art would readily appreciate how to adapt the exposure time accordingly.

Exemplary light sources include, but are not limited to:

Medium Pressure Vapor Lamp Source: Six-inch lamp operating at a power level of approximately 200 watt per inch. The curing chamber can include a conveyer transporting the sample underneath the lamp. The plane of the conveyer can be positioned approximately 3 inches from the lamp. The light energy can be set at approximately 1000 mJ/cm2 measured with Model ILT 390 Light Bug from International Light, Inc. over the range of 250 to 400 nm in one pass;

Actinic Light Source: Two sets of four fluorescent lamps can be positioned above and below to provide substantially uniform radiation over the plane of the curing stage. Approximately 4.9 mW/cm2 measured at the plane of sample from the top lamps and approximately 4.1 mW/cm2 from the bottom lamps with International light meter model IL1400A with XRL 140A detector. These lamps emit activating light in the range of greater than about 380 nm and are commercially available from Philips Electronics as model TLD-15W/03;

LED sources, such as a custom LED array with a main wavelength at 411±4 nm;

DYMAX BlueWave™ 50 UV Spot Light with the UV main output of about 3000+mW/cm2 at 365 nm, 410 nm, and at 430 nm.

Devices

As previously mentioned, the adhesive compositions provided herein can be used to bond substrates, e.g., ophthalmic components. The adhesive can be applied in a number of ways readily apparent to one of ordinary skill in the art including, but not limited to, spinning, dipping, brushing, spraying, and filling.

The substrates to be laminated can be the same as or different from one another. In one embodiment, the adhesive is disposed between two substrates, each with a different RI. For example, adhesive compositions were found to adhere surface casting Trivex® (RI=1.53) resin to a preformed polycarbonate lens (RI=1.58), or surface casting Trivex® to a preformed MR-10 lens (RI=1.67). When the substrates have different RIs, the RI of the cured adhesive composition can have a RI value close to the average RI of the two lenses. For example, when laminating preformed Trivex® lens or surface casting Trivex® resin to a preformed polycarbonate lens (RI=1.58), the RI of the cured adhesive composition should be in the range of about 1.54 to about 1.57, and preferably about 1.55 to about 1.56. The advantage of having an adhesive RI close to the RI of both lenses is to reduce or eliminate light interference resulting from the difference in RI of the two lenses.

Accordingly, in another embodiment, a device is provided. The device comprises a) a first substrate, e.g., ophthalmic component, b) a second substrate, e.g., ophthalmic component, and c) a curable adhesive composition disposed between the first and second ophthalmic components. The adhesive can be any of the adhesives described herein, such as those comprising at least one high index-high viscosity component having a refractive index, before curing, of at least 1.56 at 25° C., and a viscosity, before curing, of at least 15,000 cP at 25° C., and a photoinitiator. The refractive index of the adhesive composition, after curing, is i) about equal to the refractive index of at least one of the first ophthalmic component and the second ophthalmic component, ii) between the refractive index of the first lens and the refractive index of the second lens, or iii) about equal to the average refractive index of the first ophthalmic component and the second ophthalmic component. In one embodiment, the refractive index of the adhesive composition, after curing, is within 0.03, preferably within 0.02, of the refractive index of at least one of the first ophthalmic component and the second ophthalmic component. In another embodiment, at least one of the first ophthalmic component and the second ophthalmic component has a refractive index of about 1.67.

EXAMPLES

Mixing the Components

The amount of the solid photoinitiator to be used can be taken from pre-dissolved concentrated form in the range of 3-6% by weight. High viscosity and/or non-pourable components can be preheated and mixed with others. Solid monomers or oligomers can also be preheated and mixed with a low viscosity component before adding a predetermined amount of initiator. The final composition can be mixed for at least 10 to 15 minutes away from light before storing it in a brown polypropylene bottle at regular room temperature conditions.

Sample Preparation

The components that form the light curable adhesive were used as received. Exemplary components are listed in the Tables below.

Assembly and Curing: About 0.5 g of the adhesive is placed on a first substrate, e.g., a pre-cleaned round, flat piece of uncoated MR-10 having a diameter of about 44 mm and a thickness of about 1.2 mm (supplied by PixelOptics, Inc.). A second substrate, e.g., the same as the first, is placed with a gentle contact to the adhesive on top the first piece until the adhesive spreads to the edge of the substrates. The assembly then proceeds to the curing step, e.g., it is placed on an actinic light source curing stage. The curing stage is about 5 mm thick round clear crown glass and is about 80 mm in diameter.

The assembly is exposed to the light from the top and bottom for 1.5 min. The cured assembly is examined and left at room temperature for at least 10 min before the adhesion test.

Refractive Index Measurement: Abbe-3L Refractometer from Fisher Scientific was used to measure the refractive index of the adhesives in liquid state (before curing) or solid cured state. This Refractometer has an index range from 1.30 to 1.71 relative to Sodium D line (589.3 nm). 1-bromonaphthalene from Fisher Scientific was used as contact liquid for solid test pieces with indices less 1.64nD, and Series M 1.75nD from Cargill was used as contact liquid for solid test pieces with indices more than 1.64nD.

Adhesion Strength: The adhesion strength was evaluated based on how much effort was needed to separate the two glued pieces. A hand-held, mold scraper tool commercially available under parts code TTAR 05-020 for the handle and TTAR 05-021 for the de-molding blade from Optical Dynamics was used to separate the two glued pieces and assign poor, good or excellent adhesion ratings as follows:

Poor: Easy to delaminate from both sample pieces by hand without using the scraper tool.

Good: The two sample pieces were difficult to delaminate using a razor blade.

Excellent: The two sample pieces do not delaminate using the scraper tool unless excessive force is applied. For this case, separation was associated with broken portions, with the cured adhesive randomly remaining on the separate pieces of the test sample.

The adhesive compositions that exhibited good RI match and good adhesion in the initial screening tests were further tested for adhesion performance and RI match in actual lens laminates to form composite lens. The adhesion performance was tested by surfacing and edging of the final lens laminate looking for any sign of delamination. All preferred adhesive compositions show good RI match and good or excellent adhesion.

The invention can be further illustrated by referring to the following adhesive compositions in the Tables below. (RI=refractive index; visc.=viscosity; comp.=composition)

TABLE I

Exemplary Components

| RI | visc | Chemical Name | Proprietary Name |
|---|---|---|---|
| | | Phenyl bis(2,4,6-trimethyl benzoyl) phosphine oxide | Irgacure 819 |
| | | 1-Hydroxy cyclohexyl phenyl-ketone | Irgacure 184 |
| | | 2-Hydroxy 2-methyl 1-phenyl 1-propane | Darocur 1173 |
| 1.579; 1.58 | 164000; 72000 | Brominated Aromatic Urethane Acrylates | CN2600 |
| 1.6 | solid | Tribromophenyl Acrylate | BR30 |
| 1.621 | 91000 at 60 C. | 9,9-Bis{4-(2-acryloyloxyethoxy)phenyl}fluorene | NK-BPEF |
| 1.68 | 18 | vinyl resin | NTT #6205 |
| | | Epoxy oligomer | EP45HT |
| 1.576 | 150 | polyethylene glycol o-phenyl phenyl ether acrylate | NK-Ester A-Len-10 |
| 1.55 | 56000 | Urethane acrylate | CN9167 |
| | | Aliphatic urethane acrylate | CN2922 |
| 1.5255 | 250 | acrylic oligomer | CN 131B |
| 1.4366 | 6 | 2(2-ethoxyethoxy) ethyl acrylate | SR 256 |
| 1.516 | 12 | 2-phenoxyethyl acrylate | SR 339 |
| 1.534 | 1080 | ethoxylated (4) trimethylolpropane triacrylate | SR 601 |
| | | ethoxylated (4) bisphenol diacrylate | |
| 1.4691 | 95 | ethoxylated (6) trimethylolpropane triacrylate | SR 499 |
| 1.47 | 9 | Isobornyl acrylates | SR 506 |
| | | Glycidyl methacrylate | SR 379 |
| 1.456 | <10 | 1,6 hexanediol diacrylate | SR 238 |
| 1.495* | 65 | alkoxylated phenol acrylate | CD 9088 |
| 1.449 | 5 | 2 hydroxyethyl acrylate | 2-HEA |
| 1.555 | <10 | Phenylthioethylacrylate | PTEA |
| | | Alkoxylated nonylphenol acrylate | 614 |
| | | Glycidyl methacrylate | SR 379 |
| | | ethoxylated (10) bisphenol diacrylate | SR 602 |
| | | Ortho diallyl bisphenol A | |
| | | Diallylether bisphenol A | |
| 1.633 | 70 | 1,2-bis(2-mercapto ethylthio)-3-mercapto propane | |
| 1.523; 1.517 | 67; 190 | Trimethylolpropane tris(3-mercaptopropionate) | |
| 1.64 | 250 | 2-mercaptoethylthio-3-propanthiol sulfide | |
| 1.53 | 250 | Pentaerythritol tetrakis(3-mercaptopropionate) | |
| 1.59 | <10 | 2,2'-Thiodiethanethiol | |
| 1.631 | <10 | 1-Chloro Naphthalene | |
| 1.656 | <10 | 1-Bromo Naphthalene | |
| 1.6515 | <10 | 1-Naphthaldehyde | |
| | | 1-Naphthylamine | |
| | | 1-Naphthol | |

For the exemplary components, RI and viscosity were measured at 25° C., except where noted by *, which were provided at the closest temperature available. The RI of the compositions before and after curing was measured at 23° C.

TABLE II

| Exemplary High Index Adhesive Compositions | | | | | | | |
|---|---|---|---|---|---|---|---|
| | H1 | H2 | H3 | H4 | H5 | H6 | H7 |
| Irgacure 819 | 0.41 | 0.41 | 0.316 | 0.276 | 0.295 | 0.193 | 0.18 |
| CN2600 | 21.74 | 14.32 | 16.06 | 3.98 | 9.6 | 2.78 | 2.65 |
| BR30 | | | | | | | |
| NK-Ester A-BPEF | | | 36.32 | 58.58 | 48.23 | 41 | 39 |
| NTT #6205 | 60 | 59.9 | 47.3 | 37.16 | 41.88 | 26.33 | 24.74 |
| NK-Ester A-Len-10 | 17.85 | 25.27 | | | | | |
| CN 131B | | | | | | | |
| 1,2-bis(2-mercapto ethylthio)-3-mercapto propane | | | | | | 30 | 23.39 |
| 1-Chloro Naphthalene | | | | | | | 10.04 |
| Trimethylolpropane tris(3-mercaptopropionate) | | | | | | | |
| Composition RI (pre-cure) | 1.64 | 1.64 | 1.64 | 1.64 | 1.64 | 1.64 | 1.64 |
| Composition RI (cured) | 1.674 | 1.67 | 1.669 | 1.663 | 1.669 | 1.676 | 1.672 |

| | H8 | H9 | H10 | H11 | H12 |
|---|---|---|---|---|---|
| Irgacure 819 | 0.15 | 0.15 | 0.17 | 0.15 | 0.15 |
| CN2600 | | | | 57.69 | 38.01 |
| BR30 | 24.17 | 20.91 | 36.12 | | |
| NK-Ester A-BPEF | 24.16 | 20.91 | 19.54 | | |
| NTT #6205 | 16.67 | 23.63 | 14.58 | | |
| NK-Ester A-Len-10 | | | 2.6 | 42.16 | 61.84 |
| CN 131B | 9.55 | 8.91 | | | |
| 1,2-bis(2-mercapto ethylthio)-3-mercapto propane | 25.3 | 25.49 | 16.2 | | |
| 1-Chloro Naphthalene | | | | | |
| Trimethylolpropane tris(3-mercaptopropionate) | | | 10.8 | | |
| Composition RI (pre-cure) | 1.62 | 1.6303 | 1.6173 | 1.5813 | 1.58 |
| Composition RI (cured) | 1.660 | 1.668 | 1.648 | 1.608 | 1.609 |

| | H13 | H14 | H15 | H16 | H17 | H18 | H19 |
|---|---|---|---|---|---|---|---|
| Irgacure 819 | 0.24 | 0.219 | 0.152 | 0.19 | 0.19 | 0.19 | 0.22 |
| Cyracure UVI6976 | | | | | | | |
| CN2600 | | | | | | | 22.41 |
| BR30 | | | 15.6 | 15.78 | 15.68 | 15.83 | 15.33 |
| NK-BPEF | 17.88 | 19.6 | 15.6 | 15.78 | 15.68 | 15.83 | 15.33 |
| NTT #6205 | 36.74 | 33.21 | 34.5 | 32.12 | 31.92 | 32.23 | 31.44 |
| EP45HT | | | | | | | |
| NK-Ester A-Len-10 | | | | | | | |
| CN9167 | 9.02 | 9.837 | 9.837 | 21.2 | 21.07 | 21.29 | |
| CN131B | | | | 5.89 | 4.45 | 4.48 | 5.26 |
| SR506 | | | 3.14 | | | | |
| PTEA | 6.58 | 6.118 | 6.118 | | | | |
| Diallylether bisphenol A | | | | | | | |
| Trimethylolpropane tris(3-mercaptopropionate) | 8.22 | 14.507 | 7.52 | | | | |
| 2-Mercaptoethylthio-3-propanthiol sulfide | 12.34 | | 17.59 | | | | |
| Pentaerythritol tetrakis(3-mercaptopropionate) | | | | 10.45 | | 2.95 | 3 |
| 2,2'-Thiodiethanethiol | | 6.644 | 6.644 | | 11 | 7.2 | 7.02 |
| 1-Bromo Naphthalene | 8.98 | 9.88 | | | | | |
| 1-Chloro Naphthalene | | | | | | | |
| 1-Naphthaldehyde | | | | | | | |
| 1-Naphthylamine | | | | | | | |
| 1-Naphthol | | | | | | | |
| Composition RI (pre-cure) | 1.629 | 1.616 | 1.616 | 1.613 | 1.618 | 1.616 | 1.627 |
| Composition RI (cured) | 1.668 | 1.651 | 1.651 | 1.647 | 1.6505 | 1.647 | 1.657 |

| | H20 | H21 | H22 | H23 | H24 | H25 | H26 |
|---|---|---|---|---|---|---|---|
| Irgacure 819 | 0.21 | 0.21 | 0.06 | 0.33 | 0.41 | 0.26 | |
| Cyracure UVI6976 | | | | | | | 1.03 |
| CN2600 | 8 | 5.08 | 23.08 | 4.55 | 44.5 | | |
| BR30 | | 13.9 | | | | | |
| NK-BPEF | 19.73 | 12.88 | | | 20.20 | 46.04 | |
| NTT #6205 | 30.38 | 32.9 | 60 | 90 | | | |
| EP45HT | | | | | | | 98.97 |
| NK-Ester A-Len-10 | | | 16.86 | 5.12 | 6.44 | | |

TABLE II-continued

Exemplary High Index Adhesive Compositions

|  |  |  |  |  |  |  |  |
|---|---|---|---|---|---|---|---|
| CN9167 | 23.6 | 21.67 |  |  |  | 11.49 |  |
| CN131B | 3.94 | 3.44 |  |  |  |  |  |
| SR506 |  |  |  |  |  |  |  |
| PTEA |  |  |  |  |  | 17.40 |  |
| Diallylether bisphenol A |  |  |  |  |  | 4.76 |  |
| Trimethylolpropane tris(3-mercaptopropionate) | 8.46 | 6.04 |  |  |  |  |  |
| 2-Mercaptoethylthio-3-propanthiol sulfide | 5.67 | 4.03 |  |  |  |  |  |
| Pentaerythritol tetrakis(3-mercaptopropionate) |  |  |  |  |  |  |  |
| 2,2'-Thiodiethanethiol |  |  |  |  |  |  |  |
| 1-Bromo Naphthalene |  |  |  |  |  | 11.49 |  |
| 1-Chloro Naphthalene |  |  |  |  | 17.85 |  |  |
| 1-Naphthaldehyde |  |  |  |  | 10.6 |  |  |
| 1-Naphthylamine |  |  |  |  |  | 4.82 |  |
| 1-Naphthol |  |  |  |  |  | 3.74 |  |
| Composition RI (pre-cure) | 1.609 | 1.616 | 1.64 | 1.67 | 1.61 | 1.606 | 1.583 |
| Composition RI (cured) | 1.638 | 1.642 | 1.668 | 1.70 | 1.628 | 1.627 | 1.603 |

|  | H27 | H28 | H29 | H30 | H31 | H32 | H33 | H34 |
|---|---|---|---|---|---|---|---|---|
| Igacure 819 | 0.38 | 0.50 | 0.58 | 0.30 | 0.49 | 0.28 | 0.28 | 0.21 |
| Cyracure UVI6976 | 0.23 |  |  |  |  |  |  |  |
| SR506 |  |  |  |  |  |  | 10.08 | 10.18 |
| CN2600 |  |  |  |  |  |  |  |  |
| Tribromophenyl Acrylate |  |  |  |  |  |  |  |  |
| NK- BPEF | 41.15 | 68.15 | 51.10 | 40.83 | 42.83 | 24.76 | 22.26 | 18.17 |
| NTT #6205 |  |  |  |  |  | 42.20 | 37.93 | 30.94 |
| 2-Mercaptoethylthio-3propanthiol sulfide |  |  |  |  |  |  |  | 16.45 |
| EP45HT | 22.82 |  |  |  |  |  |  |  |
| NK-ester A-Len-10 |  |  |  |  |  |  |  |  |
| CN9167 |  |  | 25.21 | 20.13 | 21.54 | 12.45 | 11.19 | 9.14 |
| PTEA | 12.45 | 13.30 | 13.50 | 11.37 | 13.56 | 7.84 | 7.05 | 5.75 |
| Ortho diallyl bisphenol A |  | 18.05 | 9.61 | 8.00 |  |  |  |  |
| 2,2'-Thiodiethanethiol |  |  |  | 19.37 |  |  |  |  |
| 1-Chloro Naphthalene |  |  |  |  |  |  |  |  |
| 1-Bromo Naphthalene | 22.97 |  |  |  | 21.58 | 12.47 | 11.21 | 9.16 |
| Composition RI (pre-cure) | 1.608 | 1.606 | 1.592 | 1.59 | 1.6040 | 1.6370 | 1.6180 | 1.618 |
| Composition RI (cured) | 1.6290 |  | 1.60 | 1.6160 | 1.6313 | 1.6710 | 1.6540 | 1.6570 |

The compositions listed in the table above yield adhesives that provide a good RI match, as indicated by the invisible seal fixtures of the diffractive pattern region. Most exhibit good adhesion, while some (labeled in bold) exhibit excellent adhesion strength.

TABLE III

Exemplary Mid-Index Adhesive Compositions

|  | M1 | M2 | M3 | M4 | M5 | M6 | M7 |
|---|---|---|---|---|---|---|---|
| Irgacure 819 | 0.30 | 0.30 | 0.30 | 0.30 | 0.3 |  |  |
| Irgacure 184 | 1.20 | 1.20 | 1.20 | 1.20 |  | 3 | 3 |
| Darocur 1173 |  |  |  |  | 1.2 |  |  |
| CN2600 | 19.7 | 19.7 | 32.15 | 44.6 | 19.7 | 19.4 | 31.66 |
| SR 256 |  | 2.66 |  |  |  |  |  |
| SR 339 |  | 6.21 |  |  |  |  |  |
| SR 601 | 45.3 | 45.3 | 35.05 | 24.8 |  |  |  |
| SR 499 | 9.85 | 9.85 | 9.57 | 9.28 |  |  |  |
| CD 9088 | 8.87 |  | 8.15 | 7.44 |  |  |  |
| 2-HEA | 14.78 | 14.78 | 13.58 | 12.38 |  |  |  |
| SR 602 |  |  |  |  |  |  |  |
| SR 256 |  |  |  |  | 2.66 |  |  |
| SR 339 |  |  |  |  | 6.21 |  |  |
| SR 601 |  |  |  |  | 45.31 | 44.62 | 34.52 |
| SR 499 |  |  |  |  | 9.85 | 9.7 | 9.42 |
| CD 9088 |  |  |  |  | 8.73 | 8.04 |  |
| 2-HEA |  |  |  |  | 14.78 | 14.55 | 13.38 |
| Composition RI (pre-cure) | 1.52 | 1.52 | 1.53 | 1.53 | 1.520 | 1.520 | 1.525 |
| Composition RI (cured) | 1.55 | 1.55 | 1.55 | 1.56 | 1.550 | 1.550 | 1.555 |

The compositions listed in the table above yield adhesives that provide good adhesion and good RI match. These compositions may be useful to surface cast Trivex® to preformed MR-10 lens, since they have an RI between the RI of MR-10 (1.67) and Trivex® (1.53).

TABLE IV

Exemplary Low-Index Adhesive Compositions

|  | L1 | L2 | L3 | L4 | L5 |
|---|---|---|---|---|---|
| Irgacure 819 | 0.26 | 0.35 | 0.10 | 0.37 | 0.3 |
| Irgacure 184 |  |  |  | 1.47 |  |
| Darocur 1173 |  |  |  |  | 1.2 |
| CN2600 |  |  | 31.84 | 19.63 | 19.7 |
| CN2922 | 69.11 |  | 17.08 |  |  |
| CN 131B |  |  | 14.85 |  |  |
| SR 499 |  |  |  | 9.81 | 9.85 |
| SR 379 |  |  |  |  |  |
| SR 238 | 17.85 |  | 36.14 |  |  |
| CD 9088 |  |  |  | 8.83 | 8.87 |

TABLE IV-continued

Exemplary Low-Index Adhesive Compositions

|  | L1 | L2 | L3 | L4 | L5 |
|---|---|---|---|---|---|
| 2-HEA |  | 25.10 |  | 14.73 | 14.78 |
| 614 |  | 15.20 |  |  |  |
| SR 379 | 12.78 |  |  |  |  |
| SR 602 |  | 59.35 |  | 45.16 |  |
| SR 601 |  |  |  |  | 45.31 |
| Composition RI (pre-cure) | 1.473 | 1.507 | 1.504 | 1.508 | 1.520 |
| Composition RI (cured) | 1.495 | 1.537 | NA | 1.538 | 1.549 |

The compositions listed in the table above yield adhesives that provide good adhesion and also good RI match. These composition may be useful to adhere polycarbonate and Trivex® substrates, since they have an RI between the RI of polycarbonate (1.58) and Trivex® (1.53).

What is claimed is:

1. A curable adhesive composition, comprising:
   at least one high index-high viscosity component having a refractive index, before curing, of at least 1.56 at 25° C., and a viscosity, before curing, of at least 15,000 cP at 25° C.;
   a photoinitiator; and
   5 wt% to 25% of at least one naphthalene component selected from the group consisting of 1-chloro naphthalene; 1-bromo naphthalene; and 1-naphthaldehyde;
   wherein the adhesive composition has a refractive index, after curing, in a range from 1.64 to 1.74;
   wherein the high index-high viscosity component is selected from the group consisting of:
   brominated aromatic urethane acrylate;
   tribromophenyl acrylate; and
   9,9-bis{4-(2-cryloloxyethoxy)phenyl}fluorene.

2. The composition of claim 1, wherein the aromatic urethane acrylate is a brominated aromatic urethane acrylate.

3. The composition of claim 1, further comprising at least one vinyl resin.

4. The composition of claim 1, further comprising at least one sulfur component.

5. The composition of claim 4, wherein the sulfur component is selected from the group consisting of:
   1,2-bis(2-mercapto ethylthio)-3-mercapto propane;
   trimethylolpropane tris(3-mercaptopropionate);
   2-mercaptoethylthio-3-propanthiol sulfide;
   pentaerythritol tetrakis(2-mercaptopropoinate);
   2,2'-thiodiethanethiol;
   trimethyloltris(3-mercaptopropoinate)oethylthio-3 propanthiol sulfide;
   2,5-dimercaptomethyl-1,4-dithiane;
   4,5-(mercaptomethylthio)-1,3-dithiolane;
   4,6-(mercaptomethylthio)-1,3-dithiane;
   1,1,3,3-tetra(mercaptomethylthio)propane;
   2,3-episulfide propanyl disulfide; and
   2,3-episulfide propanyl sulfide.

6. The composition of claim 1, further comprising at least one acrylic component.

7. The composition of claim 6, wherein the acrylic component is selected from the group consisting of:
   polyethylene glycol o-phenyl phenyl ether acrylate;
   urethane acrylate;
   aliphatic urethane acrylate;
   2(2-ethoxyethoxy)ethyl acrylate;
   2-phenoxyethyl acrylate;
   ethoxylated (4) trimethylolpropane triacrylate;
   ethoxylated (6) trimethylolpropane triacrylate;
   isobornyl acrylates;
   glycidyl methacrylate;
   1,6 hexanediol diacrylate;
   alkoxylated phenol acrylate;
   alkoxylated phenol diacrylate;
   2 hydroxyethyl acrylate;
   phenyl thioethyl acrylate;
   alkoxylated nonylphenol acrylate;
   ethoxlyated tribromo phenyl acrylate;
   tetrahydrofurfuryl acrylate;
   tetrahydrofurfuryl methacrylate; and
   polyethylene glycol (200) diacrylate.

8. The composition of claim 7, wherein the composition comprises urethane acrylate.

9. The composition of claim 1, further comprising a bisphenol A component.

10. The composition of claim 9, wherein the bisphenol A component is selected from the group consisting of:
    ethoxylated (10) bisphenol A diacrylate;
    ethoxylated (4) bisphenol A diacrylate;
    ethoxylated (4) bisphenol A dimethacrylate
    diallylether bisphenol A; and
    ortho diallyl bisphenol A.

11. A curable adhesive composition, comprising:
    at least one high index-high viscosity component having a refractive index, before curing, of at least 1.56 at 25° C., and a viscosity, before curing, of at least 15,000 cP at 25° C.,
    a photoinitiator, and
    a naphthalene component selected from the group consisting of: 1-Chloro naphthalene, 1-Bromo naphthalene, and 1-Naphthaldehyde,
    wherein the adhesive composition has a refractive index, after curing, of greater than 1.50;
    wherein the high index-high viscosity is selected from the group consisting of:
    brominated aromatic urethane acrylate,
    tribromophenyl acrylate; and
    9,9-bis-{4-(2-acryloxyloxyethoxy)phenyl}fluorene.

12. The composition of claim 1, further comprising at least one epoxy resin.

13. The composition of claim 12, wherein the epoxy resin is selected from the group consisting of:
    poly[(phenyl glycidyl ether)-co-formaldehyde]oligomeric epoxide; and
    epoxy acrylates.

14. The composition of claim 1, wherein the photoinitiator comprises one or more of:
    a radical photoinitiator,
    a cationic photoinitiator, and
    an anionic photoinitiator.

15. A The composition of claim 14, wherein the photoinitiator comprises at least one radical photoinitiator selected from the group consisting of:
    bis(2,3,6-trimethlbenzoyl)-phenylphosphineoxide;
    1-hydroxcyclohexylphenylketone;
    2-hydroxy-2-methyl-1-phenyl-propan-1-one;
    bis(2,6-dimethoxy bezoyl)-2,4,4-trimethylpenty 1 phospheine oxide;
    2,4,6-trimethylbezoyldiphenylphosphine;
    2,2-dimethoxy-2-phenylacetophenone;
    4-(2-hydroxyethoxy)phenyl-(2-hydroxy-2-methlpropyl) ketone;
    2-methyl thioxanthone;
    2-isopropyl thioxanthone;
    2-chloro thioxanthone;

xanthone;
benzophenone;
2-methyl-1-[4-methylthio)phenyl]-2-morpholino propan-1-one; and
2-benzyl-2-N,N-dimethlamino-1-(-morpholinophenyl)-1-butanone.

16. The composition of claim 15, wherein the photoinitiator comprises at least one radical photoinitiator selected from the group consisting of:
bis(2,3,6-trimethlbenzoyl)-phenylphosphineoxide;
1-hydroxcyclohexylphenylketone; and
2-hydroxy-2-methyl-1-phenyl-propan-1-one.

17. The composition of claim 14, wherein the photoinitiator comprises at least one cationic photoinitiator selected from the group consisting of:
triaryl sulfonium salt hexafluoroantimonate;
triaryl sulfonium hexafluorophosphate;
bis(4-diphenylsulfonio)-phenyl]sufid-bis-hexafluoro-phosphate;
di(alkylphenyl)iodonium salt;
diaryl iodonium hexafluoroantimonate; and
iron-arene complex.

18. A curable adhesive composition, comprising:
at least one high index-high viscosity component having a refractive index, before curing, of at least 1.56 at 25° C., and a viscosity, before curing, of at least 15,000 cP at 25° C., and
a photoinitiator, wherein the photoinitiator comprises at least one anionic photoinitiator selected from the group consisting of:
0-nitrobenzyl derivatives;
metal amine complexes;
(cyclopentadienyl)ruthenium complexes; and
(cyclopentadienyl)osmium complexes,
wherein the adhesive composition has a refractive index, after curing, of greater than 1.50;
wherein the high index-high viscosity is selected from the group consisting of:
brominated aromatic urethane acrylate,
tribromophenyl acrylate; and
9,9-bis-{4-(2-acryloxyloethoxy)phenyl}fluorene.

19. The composition of claim 1, wherein the photoinitiator comprises at least one additive selected from the group consisting of a co-catalyst, a phosphine, and an amine.

20. The composition of claim 19, wherein the photoinitiator comprises at least one additive selected from the group consisting of:
tera alkylphosphonium bromide;
tera alkylphosphonium chloride;
triphenyl phosphine;
trimethoxy phenyl phosphine;
trichloro phenyl phosphine;
alkyl amine primary;
dialkyl amine; and
trialkyamine.

21. The composition of claim 1, wherein the adhesive composition is curable by ultraviolet radiation.

22. The composition of claim 1, wherein the adhesive composition comprises:
0.01 wt % to 5 wt % of the photoinitiator; and
1 wt % to 70 wt % of the at least one high index-high viscosity component.

23. The composition of claim 22, wherein the photoinitiator comprises at least one of bis(2,3,6-trimethlbenzoyl)-phenylphosphineoxide, triaryl sulfonium salt hexafluoroantimonate, and triaryl sulfonium hexafluorophosphate.

24. The composition of claim 22, wherein the adhesive composition further comprises 10 wt % to 95 wt % of at least one vinyl resin.

25. The composition of claim 1, wherein the adhesive composition comprises 2 wt % to 50 wt % of at least one acrylic component selected from the group consisting of polyethylene glycol o-phenyl phenyl ether acrylate; urethane acrylate; acrylic oligomer; isobornyl acrylates; phenylthioethylacrylate; and ethoxlyated tribromo phenyl acrylate.

26. The composition of claim 5, wherein the adhesive composition comprises 1 wt % to 30 wt % of the at least one sulfur component, wherein the at least one sulfur component is selected from the group consisting of 1,2-bis(2-mercapto ethylthio)-3-mercapto propane; trimethylolpropane tris(3-mercaptopropionate); 2-mercaptoethylthio-3-propanthiol sulfide; pentaerythritol tetrakis(2-mercaptopropoinate); and 2,2'-thiodiethanethiol.

27. A curable adhesive composition, comprising:
at least one high index-high viscosity component having a refractive index, before curing, of at least 1.56 at 25° C., and a viscosity, before curing, of at least 15,000 cP at 25° C.,
a photoinitiator, and
a bisphenol A component selected from the group consisting of diallylether bisphenol A; and ortho diallyl bisphenol A,
wherein the adhesive composition, after curing, has a refractive index of 1.60 to 1.74;
wherein the high index-high viscosity is selected from the group consisting of:
brominated aromatic urethane acrylate,
tribromophenyl acrylate; and
9,9-bis-{4-(2-acryloxyloxyethoxy)phenyl}fluorene.

28. The composition of claim 1, wherein the adhesive composition comprises:
0.01 wt % to 5 wt % of the photoinitiator;
10 wt % to 60 wt % of the at least one high index-high viscosity component; and
1 wt % to 60 wt % of at least one acrylic component selected from the group consisting of 2(2-ethoxyethoxy)ethyl acrylate; 2-phenoxyethyl acrylate; ethoxylated (4) trimethylolpropane triacrylate; ethoxylated (6) trimethylolpropane triacrylate; alkoxylated phenol acrylate; 2 hydroxyethyl acrylate; polyethylene glycol o-phenyl phenyl ether acrylate; urethane acrylate; isobornyl acrylates; and alkoxylated nonylphenol acrylate.

29. The composition of claim 28, wherein the adhesive composition comprises:
0.01 wt % to 5 wt % of the photoinitiator, wherein the photoinitiator is selected from the group consisting of bis(2,3,6-trimethlbenzoyl)-phenylphosphineoxide; 1-hydroxcyclohexylphenylketone; and 2-hydroxy-2-methyl-1-phenyl-propan-1-one; and
10 wt % to 60 wt % of the at least one high index-high viscosity component, wherein the at least one high index-high viscosity component is selected from the group consisting of brominated aromatic urethane acrylates; and
1 wt % to 60 wt % of the at least one acrylic component, wherein the at least one acrylic component is selected from the group consisting of 2(2-ethoxyethoxy)ethyl acrylate; 2-phenoxyethyl acrylate; ethoxylated (4) trimethylolpropane triacrylate; ethoxylated (6) trimethylolpropane triacrylate; alkoxylated phenol acrylate; and 2 hydroxyethyl acrylate.

30. The composition of claim 1, further comprising a sulfur component selected from the group consisting of 2-mercaptoethylthio-3-propanthiol sulfide; 2,2'-thiodiethanethiol; and trimethyloltris(3-mercaptopropoinate)oethylthio-3 propanthiol sulfide.

31. The composition of claim 1, further comprising an epoxy resin selected from the group consisting of epoxy acrylates.

32. The composition of claim 1, further comprises a bisphenol A component selected from the group consisting of ethoxylated (10) bisphenol A diacrylate; ethoxylated (4) bisphenol A diacrylate; and ethoxylated (4) bisphenol A dimethacrylate.

33. The composition of claim 1, further comprising triallyl isocyanurate.

34. A curable adhesive composition, comprising:

0.01 wt % to 5 wt % of at least one photoinitiator;

5 wt % to 80 wt % of at least one acrylic component selected from the group consisting of acrylic oligomer; ethoxylated (4) trimethylolpropane triacrylate; ethoxylated (6) trimethylolpropane triacrylate; glycidyl methacrylate; 1,6 hexanediol diacrylate; alkoxylated phenol acrylate; alkoxylated phenol diacrylate; 2 hydroxyethyl acrylate; alkoxylated nonylphenol acrylate; ethoxylated (10) bisphenol A diacrylate; 2-phenoxyethyl acrylate; isobornyl acrylates; tetrahydrofurfuryl acrylate; tetrahydrofurfuryl methacrylate; and a sulfur component selected from the group consisting of trimethylolpropane tris(3-mercaptopropionate) and pentaerythritol tetrakis(2-mercaptopropoinate), wherein the adhesive composition, after curing, has a refractive index of 1.49 to 1.55.

35. The composition of claim 34, wherein the at least one acrylic component is selected from the group consisting of aliphatic urethane acrylate; ethoxylated (4) trimethylolpropane triacrylate; ethoxylated (6) trimethylolpropane triacrylate; glycidyl methacrylate; 1,6 hexanediol diacrylate; alkoxylated phenol acrylate; 2 hydroxyethyl acrylate; alkoxylated nonylphenol acrylate; and ethoxylated (10) bisphenol A diacrylate; aliphatic urethane acrylate; and polyethylene glycol (200) diacrylate.

36. The composition of claim 34, further comprising 10 wt % to 50 wt % of at least one high index-high viscosity component selected from the group consisting of brominated aromatic urethane acrylate;

tribromophenyl acrylate; and 9,9-bis{4-(2-cryloyloxyethoxy)phenyl}fluorene.

* * * * *